United States Patent [19]  [11]  4,250,962
Madgavkar et al.  [45]  Feb. 17, 1981

[54] IN SITU COMBUSTION PROCESS FOR THE RECOVERY OF LIQUID CARBONACEOUS FUELS FROM SUBTERRANEAN FORMATIONS

[75] Inventors: Ajay M. Madgavkar, Pittsburgh; Roger F. Vogel, Butler; Harold E. Swift, Gibsonia, all of Pa.

[73] Assignee: Gulf Research & Development Company, Pittsburgh, Pa.

[21] Appl. No.: 103,503

[22] Filed: Dec. 14, 1979

[51] Int. Cl.³ .......................................... E21B 43/243
[52] U.S. Cl. .................... 166/256; 166/266; 60/723
[58] Field of Search .............. 166/266, 267, 256, 260, 166/261, 59; 60/723, 217; 431/5

[56]  References Cited
U.S. PATENT DOCUMENTS

| 3,007,520 | 11/1961 | Frey | 166/260 |
|---|---|---|---|
| 3,244,231 | 4/1966 | Grekel et al. | 166/59 X |
| 3,497,000 | 2/1970 | Hujsak et al. | 166/59 |
| 3,548,938 | 12/1970 | Parker | 166/266 X |
| 3,928,961 | 12/1975 | Pfefferle | 60/723 X |
| 4,014,575 | 3/1977 | French et al. | 166/256 X |
| 4,047,877 | 9/1977 | Flanagan | 60/723 X |
| 4,169,506 | 10/1979 | Berry | 166/267 X |

Primary Examiner—Stephen J. Novosad

[57] ABSTRACT

An integrated in situ combustion process for producing subterranean carbonaceous deposits in which the resulting flue gas of low heating value is combusted over an oxidation catalyst at substoichiometric conditions and is expanded in a gas turbine which drives the air compressor for injecting the combustion air into the underground carbonaceous deposit. An oxidation catalyst is provided for reducing carbon monoxide in the combusted flue gas comprising platinum and palladium.

17 Claims, No Drawings

4,250,962

IN SITU COMBUSTION PROCESS FOR THE RECOVERY OF LIQUID CARBONACEOUS FUELS FROM SUBTERRANEAN FORMATIONS

SUMMARY OF THE INVENTION

This invention relates to the recovery of liquid carbonaceous fuel components from subterranean formations by an in situ combustion process in which the low heating value waste gas stream resulting from the subterranean combustion is itself combusted above ground in a substoichiometric combustion procedure. This partially combusted waste gas stream is preferably utilized to power a turbine-compressor unit which compresses the air for injection into the formation for the in situ combustion. More particularly, this invention relates to an in situ combustion process in which the substoichiometric combustion of the waste gas stream is carried out in the presence of a catalyst comprising platinum and palladium to cause a substantial reduction in the carbon monoxide content of the partially combusted waste gas stream.

DETAILED DESCRIPTION OF THE INVENTION

Various carbonaceous materials occur in underground deposits in substantial quantities but are resistive to recovery for aboveground use. This includes viscous oils, the oil remaining in petroleum deposits after primary or secondary production of the oil bearing formation, shale oil occurring in solid bituminous deposits, tar sands, coal seams too deep or too thin to mine, and the like. It has been proposed that these fuel materials be recovered by an in situ combustion process and some limited attempts have been made to accomplish this. The in situ recovery of underground fuel values involves the injection of air into the carbonaceous deposit to burn a minor portion of the deposit in order to produce a further portion of the deposit for use above ground as a liquid and/or gas. Such recovery procedures generally result in a gas stream of low heating value, particularly in those operations which produce a liquid hydrocarbon as the desired product. As used herein, the expressions heating value and heat content both refer to the energy obtainable by burning the combustible components in the stream of waste gas.

The obvious way to handle a waste gas stream of low heat content is to discard it directly into the atmosphere. But in recent years a greater recognition and concern about atmospheric pollution has led to legal standards in many areas controlling the direct emission to the atmosphere of waste gases containing significant amounts of hydrocarbon and carbon monoxide. Furthermore, there is a growing recognition and concern regarding the social as well as economic loss in wasting energy. Although these waste gas streams resulting from in situ combustion may have a low heating value on a unit volume analysis, they do contain a very large heating value overall because of the enormous volumes of gas involved. It has therefore become most desirable and even necessary that the heat content of these waste gas streams be utilized and that the atmosphere be spared contamination.

The combustible components in a waste gas stream from an in situ combustion process can be burned using a suitable oxidation catalyst. This hot gas can then be used to drive the turbine-compressor unit which injects the required large volumes of air at high pressure into the underground carbonaceous deposit undergoing in situ combustion. In order to obtain the full heating value of this waste gas as well as to avoid the emission of undesirable components into the atmosphere, these waste gas streams can be burned to substantially stoichiometric completion in the presence of an oxidation catalyst. But these stoichiometrically combusted waste gas streams generally vary in temperature over relatively short periods of time due to inherent variations in the heating value of these waste gas streams. In an effort to protect the gas turbine against damage resulting from these temperature fluctuations and to operate at the turbine's design temperature, the combustion process involves auxiliary temperature control such as is accomplished by the injection of supplemental fuel into the waste gas during heating value minimums and the injection of cooling air into the combusted waste gas during heating value peaks to provide a constant gas temperature.

We have determined that a waste gas stream of low heat content which varies with time can be effectively combusted at a substantially constant combustion temperature for use in a gas turbine. This is accomplished by combusting the gas with a constant amount of air which is substantially less than the amount of air required for stoichiometric combustion. Furthermore, if the heat content of the waste gas is relatively constant but so high that its stoichiometric combustion results in a gas temperature too high for use in a gas turbine, its combustion temperature can be effectively restricted to the design limits of the gas turbine by operating at substantial substoichiometric conditions with a constant quantity of combustion air. We have further discovered that this substoichiometric combustion can be carried out using a particular catalyst for the production of reduced and acceptable carbon monoxide levels.

In carrying out a hydrocarbon recovery operation by in situ combustion such as in a tertiary recovery process in a partially depleted oil field, combustion air is pumped at a substantial pressure through an injection well into the combustion zone. By a combination of heating and cracking the oil is liquefied and caused to flow to one or more production wells. The hot, substantially oxygen-free gas stream, after passage through the combustion zone is cooled down to the reservoir temperature by the time it arrives at the production well. As it is produced, it contains significant quantities of entrained liquid hydrocarbons as well as gaseous hydrocarbons and minor amounts of carbon monoxide, hydrogen and hydrogen sulfide. The liquid hydrocarbons are removed from the gas stream in an above-ground separator. The combustible component of the waste gas stream leaving the separator is principally methane but it also contains minor amounts of other hydrocarbons having up to about five carbon atoms and in some instances up to about seven carbon atoms, as well as the carbon monoxide, hydrogen and hydrogen sulfide. The remainder is principally nitrogen and carbon dioxide.

The combustible components in this waste gas stream can be mixed with a stoichiometric excess of air and burned in the presence of a suitable oxidation catalyst such as platinum if it is at its ignition, or light off, temperature, which varies with the gas composition and the nature of the oxidation catalyst. If the catalyst is provided in a suitable physical form to provide adequate contact of the large volume of gas with the catalyst, substantially complete combustion of the hydrocarbon to carbon dioxide and water is accomplished. This combusted gas stream, at an elevated pressure, can be directed to the turbine-compressor unit for compressing the combustion air which is injected into the underground combustion zone.

But, unfortunately the waste gas stream generally varies in heating value over a period of time, even from hour to hour, as a result of inherent variations in the underground formation and the combustion process. As a result, the temperature of the combusted waste gas stream will vary in temperature with complete combustion. Since gas turbines are designed for constant temperature operation, adjustments must be made to control the temperature of the combusted gas stream so that it can be utilized in a gas turbine.

We have discovered that an in situ combustion process can be successfully carried out in a subterranean hydrocarbon deposit by an integrated operation in which the heat energy in the combusted waste gas directly powers a turbine driven air compressor even though the heating value of the waste gas stream varies with time. Even though the waste gas stream varies in heating value, we obtain a constant combustion temperature by using a constant substoichiometric amount of air for the combustion which is also sufficient to provide the desired turbine operating temperature. As a result of this substoichiometric combustion, the combusted waste gas stream will still have a variable but generally minimal heating value. The heating value in the compressor exhaust gas, if significant, can be recovered by a further catalytic combustion and utilized to produce steam or heated water as may be needed on the recovery site. Or the turbine exhaust can be directly vented to the atmosphere. We have further discovered that the carbon monoxide content of the turbine exhaust can be restricted to acceptable amounts, notwithstanding the substoichiometric combustion, if the waste gas is combusted in the presence of a multicomponent oxidation catalyst as described herein.

The substoichiometric combustion of the low heating value waste gas stream is carried out by our process using an air equivalence ratio, or A.E.R., of less than 1.0, generally of at least about 0.20 up to about 0.90 (the denominator of this ratio being 1.0 is not expressed), and more generally an air equivalence ratio of at least about 0.4 and a maximum of about 0.80. As used herein, air equivalence ratio is the ratio of the amount of air actually used in the partial combustion process to the amount of air required at the same conditions of pressure and temperature for stoichiometric combustion of all combustible components in the gas stream.

In our study of the platinum-catalyzed, substoichiometric combustion of a dilute hydrocarbon stream we made several interesting observations. First, it was found that the only combustibles present in this partially combusted gas stream are carbon monoxide, hydrogen and unreacted hydrocarbon. Second, we observed that in this partial combustion the amount of carbon monoxide reached a maximum at an air equivalence ratio of about 0.6. In fact, we found that the amount of carbon monoxide substantially exceeded the amount of carbon dioxide in the combusted gas at an A.E.R. of 0.6, such that the ratio of carbon dioxide to carbon monoxide was less than 1.0 at an A.E.R. between about 0.4 and about 0.7.

As would be expected in the platinum-catalyzed reaction, the molar ratio of carbon dioxide to carbon monoxide rapidly increased as the A.E.R. approached 1.0. But surprisingly, we discovered that the molar ratio of carbon dioxide to carbon monoxide also rapidly increased as the A.E.R. was reduced to values less than about 0.4. This is surprising because it is not consistent with the conventional teaching that carbon monoxide is the result of incomplete combustion of a hydrocarbon. If this conventional teaching were applied to this particular combustion system, the ratio of carbon monoxide to carbon dioxide would be expected to increase as the air equivalence ratio decreased, and that it would be expected to be particularly large at small air equivalence ratios. We conclude from our combustion studies that the carbon monoxide in this platinum-catalyzed, substoichiometric combustion of a dilute hydrocarbon is primarily the result of secondary reactions including the steam reforming and water gas shift reactions.

In the steam reforming reaction, hydrocarbons such as methane and water are in equilibrium with carbon monoxide and hydrogen. In the water gas shift reaction carbon monoxide and water are in equilibrium with carbon dioxide and hydrogen. Thus, a study of these equilibrium reactions suggests several mechanisms for the unexpected product mixture of the oxides of carbon including the substantial production of carbon monoxide and a corresponding minimum in the carbon dioxide to carbon monoxide ratio at an air equivalence ratio of about 0.6.

When methane is the primary combustible component in the waste gas stream, it will be substantially the only hydrocarbon in the gas exhausted to the atmosphere, which is fortuitous since methane, in limited amounts, is not considered to be a pollutant in the atmosphere. It can be shown that a mixture of diluted, gaseous, paraffinic hydrocarbons will react at different rates when burned in a deficiency of air. The higher paraffinic hydrocarbons burn readily, while the lower the number of carbon atoms in the molecular structure the more resistant to combustion is the hydrocarbon. As a demonstration of this variable combustibility, a nitrogen-diluted two weight percent mixture of one to five carbon paraffinic hydrocarbons was burned in a combustion furnace with fifty percent of the stoichiometric amount of air for complete combustion. The gas, heated to 449° C. and passed in contact with a supported platinum oxidation catalyst, reached a maximum temperature of 777° C. In this combustion experiment 100 percent of the n-pentane was converted, 54.5 percent of the n-butane, 44.1 percent of the propane, 31.8 percent of the ethane and 11 percent of the methane. This demonstrates that partial combustion of a dilute gaseous hydrocarbon mixture including methane will substantially increase the proportion of methane in the product gas.

The temperature of the waste gas stream will only be moderately higher than ambient temperature due to the cooling effect of the formation following the underground combustion. Therefore, it is necessary to preheat the waste gas stream for catalytic combustion, preferably after the air for combustion has been injected into the waste gas stream. This preheating must be at least as high as the ignition, or light off, temperature of the gas. The preferred means for preheating the waste gas stream is by heat exchange with the hot combusted gas stream leaving the combustion zone. In general, two combustion chambers in series are preferred in order to avoid an excessive temperature rise in a single combustion chamber. In this two-stage combustion process, the waste gas stream is desirably preheated after the first combustion stage. The temperature of the combusted gas stream is dependent on a number of factors including the heating value of the waste gas stream, the temperature of the waste gas stream prior to preheating, the amount of air that is used for combustion, the inherent heat losses in the system, and the like.

With regard to the many conditions and variables which may be involved in any specific in situ combustion operation, the waste gas streams which are combusted to temperatures that are useful in gas turbines have a heat content of at least about 40 Btu/scf. (1,490 kJ/m$^3$, kilo Joule per cubic meter), preferably about 50 Btu/scf. (1,860 kJ/m$^3$), however, heating values as low as 15 to 25 Btu/scf. (560 to 1,250 kJ/m$^3$) can be utilized with the injection of supplemental fuel. The maximum heating value of the waste gas stream obtained by the in situ combustion procedure will be about 200 (7,450), more generally a maximum of about 150 (5,590) and most likely a maximum heating value of about 100 Btu/scf. (3,730 kJ/m$^3$).

According to our invention, the substoichiometric combustion is carried out in the presence of an oxidation catalyst comprising platinum together with a palladium cocatalyst for the reduction of carbon monoxide in the partially combusted waste gas stream. This oxidation catalyst is desirably carried on an inert support. Since the catalytic combustion inherently involves a relatively large volume of the stream of low heating value gas, the support is preferably of a design to permit good solid-gas contact at relatively low pressure drop. A suitable support can be formed as a monolith with hexagonal cells in a honeycomb design. Other cellular relatively open-celled designs are also suitable.

The support for the catalysts to be used in the process of this invention can be any of the refractory oxide supports well known in the art, such as those prepared from alumina, silica, magnesia, thoria, titania, zirconia, silica-aluminas, silica-zirconias, magnesia-aluminas, and the like. Other suitable supports include the naturally occurring clays, such as diatomaceous earth. Additional desirable supports for use herein are the more recently developed corrugated ceramic materials made, for example, from alumina, silica, magnesia, and the like. An example of such material is described in U.S. Pat. No. 3,255,027 and is sold by E. I. duPont de Nemours & Company as Torvex. More recently, metallic monoliths have been fabricated as catalyst supports and these may be used to mount the catalytic material. An example of these supports is Fecralloy manufactured by Matthey Bishop, Inc. under U.S. Pat. Nos. 3,298,826 and 3,920,583.

If desired, the platinum and the palladium can be mounted directly onto the surface of the monolith. Or the monolith can first be coated with refractory oxide, such as defined above, prior to the deposition of these materials. The addition of the refractory oxide coating allows the catalyst to be more securely bound to the monolith and also aids in its dispersion on the support. These coated monoliths possess the advantage of being easily formed in one piece with a configuration suitable to permit the passage of the combustion gases with little pressure drop. The surface area of the monolith generally is less than one square meter per gram. However, the coating generally has a surface area of between about ten and about 300 m$^2$/g. Since the coating is generally about ten percent of the coated support, the surface area of the coated support will therefore generally be between about one and about 30 m$^2$/g.

In preparing the platinum and palladium combination it is preferred that the palladium cocatalyst be placed on the support before the platinum. However, the reverse order of emplacement is also suitable or the platinum and palladium can be added in a single step. In one procedure a suitable salt of the palladium is dissolved in a solvent, preferably water and the support is impregnated with this solution. If desired, the impregnated support can next be treated with a suitable gas, generally ammonia or hydrogen sulfide, to cause the catalyst metal to precipitate uniformly on the support as the hydroxide or sulfide as the case may be. However, this precipitation step is not necessary and can be omitted. It is then dried and calcined in air at about 425° to 650° C., preferably at about 540° C. Hydrogen may be used to reduce the palladium to the metal, if desired.

Platinum is impregnated onto the support as an aqueous solution of a water-soluble compound such as chloroplatinic acid, ammonium chloroplatinate, platinum tetramine dinitrate, and the like. The impregnated catalyst can then be gassed with hydrogen sulfide, if desired, to cause precipitation of the platinum as the sulfide, however, this precipitation step is again not necessary and can be omitted. It is again dried and then calcined in air at about 425° to 650° C., preferably at about 540° C. In general, it is not certain whether the catalyst metals after calcination are in the form of the oxide, the sulfide when sulfiding is used, or the metal itself. Nevertheless, for convenience, the platinum and palladium are reported as the metal.

The catalyst metals can also be added to the coated monolith as a slurry of finely ground powders. Powdered metal is preferred but the metals can also be added as the powdered oxides. The powdered metals can be added together or in succession with calcining as described above. In a further alternative the coating material such as powdered alumina is impregnated with a solution of the metal compounds and calcined. The monolith is then coated with a slurry of this powder and calcined. In this technique the catalyst components can be added to the monolith separately or in one step.

Since the amount of the metals on the support is not critical, the supported catalyst can be prepared to contain between about 0.005 and about 20 weight percent of palladium, and preferably between about 0.1 and about 15 weight percent of this metal. The platinum can be used in an amount to form a finished supported catalyst containing between about 0.005 and about ten weight percent of the metal, and preferably about between 0.01 and about five weight percent platinum. Since the relative amount of the two metals is not critical either, the catalyst can broadly contain a weight ratio of palladium to platinum of between about 0.02:1 and about 200:1, preferably between about 0.2:1 and about 20:1, and most preferably between about 0.5:1 and about 5:1. The total and relative amounts of the two metals on the support can be suitably adjusted, as required, under different conditions of combustion and with different waste gas compositions to obtain a desired oxidation and carbon monoxide content.

DESCRIPTION OF PREFERRED EMBODIMENTS

The reactor used in the following experiments was a one-inch I.D. forged steel unit which was heavily insulated to give adiabatic reaction conditions. The catalyst consisted of three one-inch (2.5 cm.) monoliths wrapped in a thin sheet of a refractory material (Fiberfrax, available from Carborundum Co.). The catalyst compositions, as specified, are only approximate because they are based on the composition of the impregnating solution and the amount absorbed and are not based on a complete chemical analysis of the finished catalyst. Well insulated preheaters were used to heat the gas stream before it was introduced into the reactor. The temperatures were measured directly before and after the catalyst bed to provide the inlet and outlet temperatures. An appropriate flow of preheated nitrogen and air was passed over the catalyst until the desired feed temperature was obtained.

Preheated hydrocarbon was then introduced at a gas hourly space velocity of 42,000 per hour on an air-free basis and combustion was allowed to proceed until steady state conditions were reached. The feed gas stream contained 94.5 mol percent nitrogen, 3.75 mol percent methane, 0.98 mol percent ethane, 0.77 mol percent propane and 400 ppm. hydrogen sulfide, except where otherwise noted. The heating value of this feed stream is about 75 Btu/scf. (2,800 kJ/m$^3$). The experiments were conducted at atmospheric pressure. The analyses were made after steady state conditions were reached on a water-free basis. The conversion is the overall conversion of all hydrocarbon constituents. No measurable free oxygen occurred in the product gas stream.

EXAMPLE 1

The preparation of a catalyst containing platinum and palladium as the cocatalyst is described. A Torvex monolith was used as the support. The Torvex support, a product of E. I. duPont de Nemours and Company was a mullite ceramic in the shape of a honeycomb having a coating of alumina of about 25 m$^2$/g. surface area. The support was cut into one inch diameter by one inch deep pieces and freed from dust. This support material was impregnated with an 80 ml. aqueous solution containing 11.82 g. of palladium ammonium nitrate comprising 36 weight percent palladium by soaking for 15 minutes. These pieces of support were drained of excess solution, dried at 120° C. and calcined overnight at 1000° F. (538° C.).

The pieces were next soaked for 15 minutes in an 80 ml. aqueous solution containing 4.60 g. of chloroplatinic acid comprising 40 weight percent platinum. After removing excess solution from the support material, it was drained, then dried at 120° C. and calcined at 1000° F. (538° C.) The finished catalyst contained about 0.7 weight percent palladium and about 0.3 weight percent platinum.

EXAMPLE 2

A catalyst was made as described in Example 1 containing about 0.3 percent platinum but the palladium was omitted for comparison purposes. The operating data, including the inlet and outlet gas temperatures, and results for a number of combustion runs over a series of air equivalence ratios are set out in Table I.

TABLE I

| AER | Temperature, °C. Inlet | Outlet | CO Mol % | CO$_2$ Mol % | Conv. % |
|---|---|---|---|---|---|
| 0.2 | 371 | 506 | 0.14 | 1.28 | 19.3[a] |
| 0.3 | 343 | 572 | 0.45 | 1.66 | 23.3 |
| 0.4 | 343 | 620 | 1.17 | 1.69 | 42.1 |
| 0.5 | 343 | 669 | 1.94 | 1.66 | 57.3[a] |
| 0.6 | 343 | 713 | 2.42 | 1.79 | 71.4 |
| 0.7 | 343 | 769 | 2.11 | 2.43 | 81.5[a] |

TABLE I-continued

| AER | Temperature, °C. Inlet | Outlet | CO Mol % | CO$_2$ Mol % | Conv. % |
|---|---|---|---|---|---|
| 0.8 | 343 | 869 | 0.75 | 4.03 | — |

[a]Average of 2 runs on different days.

A study of Table I discloses that over a wide range of air equivalence ratios the amount of carbon dioxide remains relatively constant between an A.E.R. of about 0.3 to about 0.6 while the amount of carbon monoxide rapidly increases in this range to an unexpected peak at an A.E.R. of about 0.6. Over this range of increasing oxygen, the conversion and overall amount of carbon oxides increase, as would be expected. It is further noted that the largest carbon dioxide to carbon monoxide ratio surprisingly occurs at minimum oxygen, such as illustrated at an A.E.R. of 0.2, since the production of carbon dioxide unexpectedly decreases much more than the production of carbon monoxide as the amount of oxygen decreases in the low range of air equivalence ratios.

That the maximum carbon dioxide to carbon monoxide ratio occurs at minimum oxygen strongly suggests to us that the principal source of carbon monoxide in the system is not from incomplete combustion, that is, the direct but partial oxidation of the hydrocarbon to carbon monoxide and water. If this reaction were the principal source of the carbon monoxide, then the minimum carbon dioxide to carbon monoxide ratio would be expected to occur at minimum oxygen. Instead the surprising occurrence of maximum carbon monoxide and minimum carbon dioxide ratio in the mid A.E.R. range, strongly suggests that another mechanism is the primary source of the carbon monoxide, such as the stream reforming reaction and the water gas shift reaction.

EXAMPLE 3

The catalyst described in Example 1 was used in a series of combustion runs. The operating data are set out in Table II.

TABLE II

| AER | Temperature, °C. Inlet | Outlet | CO Mol % | CO$_2$ Mol % | Conv. % |
|---|---|---|---|---|---|
| 0.2 | 371–427[a] | 1105 | 0.42 | 1.22 | 27.1 |
| 0.5 | 343 | 1438 | 1.47 | 1.86 | 51.9 |
| 0.6 | 343 | 1429 | 1.46 | 2.46 | 54.7 |
| 0.6 | 343–371[a] | 1487 | 1.75 | 2.18 | 63.2 |
| 0.8 | 393–427[a] | 1719 | 1.53 | 3.08 | 88.1 |
| 0.8 | 343 | 1594 | 2.05 | 2.58 | 73.3 |

[a]The inlet temperature varied between these values during the run.

EXAMPLE 4

A catalyst was prepared as described in Example 1, except that the catalyst during its preparation was twice treated with hydrogen sulfide gas for thirty minutes to precipitate the palladium and platinum, respectively, as the sulfide immediately following each impregnation and draining procedure. The catalyst following calcination contained about 0.7 weight percent palladium and 0.3 weight percent platinum. The operating data of a series of combustion runs carried out with this catalyst are set out in Table III.

TABLE III

| AER | Temperature, °C. Inlet | Temperature, °C. Outlet | CO Mol % | CO$_2$ Mol % | Conv. % |
|---|---|---|---|---|---|
| 0.2 | 344 | 538 | 0.13 | 1.32 | 5.2 |
| 0.5 | 343 | 751 | 0.97 | 2.34 | 51.2 |
| 0.6 | 342 | 800 | 1.77 | 2.05 | 63.3 |
| 0.8 | 342 | 970 | 1.35 | 2.58 | 100 |

EXAMPLE 5

Data for a further series of bimetallic catalysts that were unsuccessfully tested at an air equivalence ratio of 0.7 are set out in Table IV. All of the catalysts contained approximately 0.3 weight percent platinum except where indicated otherwise.

TABLE IV

| Cocatalyst | Pt | Inlet Temp. °C. | Conv. % |
|---|---|---|---|
| CuO | 0.3% | 410 | a |
| 1%Bi$_2$O$_3$ | 0.3% | 410 | a |
| 1%V$_2$O$_5$ | 0.3% | 389 | a |
| 0.3%CuO + 0.3%Cr$_2$O$_3$ | 0.3% | 399 | a |
| 0.3%CuO + 0.3%Cr$_2$O$_3$ | none | 343 | b |
| 1%PbO | 0.3% | 342 | b | a Unstable combustion, steady state combustion never reached.
b No combustion.

The data in this table show that some metals that are known to be effective oxidation catalysts are not effective as cocatalysts with platinum in the present substoichiometric process. For example, copper oxide, vanadium oxide, lead oxide and copper chromite are recognized as oxidation catalysts.

EXAMPLE 6

In this experiment a different low heating value gas stream containing higher hydrocarbons and carbon monoxide was used. It contained 5.5 volume percent of a hydrocarbon-carbon monoxide mixture which comprised 67.89 mol percent methane, 7.76 percent ethane, 5.83 percent propane, 7.73 percent n-butane, 5.04 percent n-pentane, 0.96 percent n-hexane and 4.79 mol percent carbon monoxide. The remainder was nitrogen and 400 ppm. hydrogen sulfide. The catalyst contained about 0.5 percent platinum on an alumina-coated Torvex support. The operating data over a series of air equivalence ratios are set out in Table V.

TABLE V

| AER | Temperature,°C. Inlet | Temperature,°C. Outlet | CO Mol % | CO$_2$ Mol % | Conv. % |
|---|---|---|---|---|---|
| 0.2 | 343 | 496 | 0.10 | 1.56 | 18.3 |
| 0.3 | 343 | 564 | 0.68 | 1.86 | 25.9 |
| 0.4 | 343 | 621 | 1.76 | 1.64 | 36.9 |
| 0.5 | 343 | 668 | 3.20 | 1.23 | 59.2 |
| 0.6 | 343 | 715 | 3.64 | 1.57 | 81.3[a] |
| 0.7 | 343 | 766 | 3.11 | 2.42 | 85.7 |
| 0.8 | 343 | 846 | 1.77 | 3.46 | ~100 |

[a]Average of 2 runs on different days.

EXAMPLE 7

A series of runs were carried out under pressure using an inlet pressure to the reactor of 90 psia (620 kPa). The catalyst again contained about 0.5 percent platinum on an alumina-coated Torvex support. The operating data over a series of air equivalence ratios and gas hourly space velocities ($10^{-3}$hr.$^{-1}$) are set out in Table VI.

TABLE VI

| GHSV | AER | Temperature,°C. Inlet | Temperature,°C. Outlet | CO Mol % | CO$_2$ Mol % | Conv. % |
|---|---|---|---|---|---|---|
| 20 | 0.4 | 343 | 608 | 1.12 | 2.06 | 38.6 |
| 42 | 0.4 | 199 | 619 | 0.52 | 2.41 | 36.3 |
| 80 | 0.4 | 260 | 694 | 0.86 | 2.09 | 37.9 |
| 100 | 0.4 | 260 | 721 | 0.81 | 2.03 | 36.6 |
| 15[a] | 0.42 | 260 | 580 | 0.54 | 2.23 | 40.8 |
| 100 | 0.5 | 260 | 773 | 1.61 | 2.00 | 49.9 |
| 25[b] | 0.61 | 343 | 644 | 1.01 | 2.03 | 66.5 |

[a]Gas contained 5.27 percent hydrocarbon at 72 Btu/scf. (2,680 kJ/m$^3$).
[b]Gas contained 3.7 percent hydrocarbon at 51 Btu/scf. (1,900 kJ/m$^3$).

The data in the above examples suggest that the palladium in the bimetallic catalyst functions in some manner to cause a reduction in carbon monoxide such as, for example, by directing the steam reforming reaction and the water gas shift reaction to reduced carbon monoxide levels. When two combustion zones in series are utilized, the bimetallic catalyst can be used in both combustion zones for reduced carbon monoxide levels. Or, if preferred, for reduced carbon monoxide levels, the bimetallic catalyst can be used in one combustion zone and the monometallic platinum oxidation catalyst can be used in the other combustion zone.

The information obtained from these experiments is utilized in an integrated tertiary oil recovery operation by in situ combustion according to the following example.

EXAMPLE 8

An in situ fire flood is initiated in an oil zone in an underground petroleum reservoir at an overall depth of about 6,000 feet (1,830 meters). Oil production from the formation had been exhausted following secondary recovery by water injection. The fire is initiated in the formation and steady state conditions are reached in about 10 weeks. At this time about 9.1 million scf. ($2.6 \times 10^5$ cubic meters standardized to one atmosphere pressure and 15.6° C.) per day of air at a temperature of about 200° F. (93° C.) and a pressure of about 3,800 psi. (26.2 MPa) are pumped into the injection well by a multistage compressor, which is driven by a gas turbine. The combusted gas and entrained hydrocarbon liquids are produced in adjacent production wells. The entrained liquids are removed in a separator resulting in about 7.5 million scf. ($2.1 \times 10^5$ cubic meters) per day of liquid-free, waste flue gas of low heat content. The temperature of this flue gas is about 95° F. (35° C.) and its pressure is about 150 psig. (1.03 MPa). Its average analysis over a 19-day period is about 2.2 percent methane, about 0.5 percent ethane, about 0.4 percent propane, about 0.3 percent butane, about 0.25 percent pentanes, about 0.2 percent hexanes and higher, about 500 ppm. sulfur, about 15 percent carbon dioxide, about one percent argon and the remainder nitrogen. Its average heat content for this 19-day period is about 78 Btu/scf. (2,920 kJ/m$^3$) with a maximum value of about 91 and a minimum value of about 61 during this period.

This flue gas is combusted in two stages. The catalyst in the first stage is a bimetallic oxidation catalyst comprising about 0.7 weight percent palladium and about 0.3 percent platinum impregnated on an alumina-coated Torvex monolithic ceramic support. The catalyst in the second stage is a monometallic platinum oxidation catalyst comprising about 0.3 percent platinum on the same support as used in the first stage. Over this 19-day period under study the flue gas is combusted by the injection of a constant amount of air, approximately equally divided between the input to each combustion stage, to provide an average air equivalence ratio of about 0.64. As a result the combustion is substoichiometric over the entire 19-day period. The flue gas-air mixture is heated above its ignition temperature by heat exchange with the combusted gas from the first stage before it is introduced into the first combustor. The combusted flue gas is mixed with the second portion of combustion air after the heat exchanger and prior to entering the second combustor. The gas stream leaving the second combustor has a temperature of about 1,550° F. (843° C.). This hot gas stream is used to drive the gas turbine which is designed for an operating temperature of 1,450° F. (788° C.). Therefore, a sufficient quantity of the 200° F. (93° C.) compressed air is bled from the compresed air line and injected into the combusted flue gas prior to the turbine inlet to drop its temperature to about 1,450° F. (788° C.). The combusted flue gas is introduced into the turbine at a pressure of about 90 psia (0.62 MPa) and exits at near atmospheric pressure. Since the first combustor used the bimetallic catalyst, the turbine exhaust contains less than one percent carbon monoxide permitting it to be vented directly to the atmosphere.

The pressure of the air injected into subterranean deposits of carbonaceous materials will vary over a wide range, such as about 500 psi (3.45 MPa) to about 5,000 psi. (34.5 MPa) or even wider. The actual pressure used depends on many factors including the depth and down-hole pressure in the formation, the permeability of the formation, the distance between the injection and producing holes, and the like. In any particular recovery operation utilizing in situ combustion the injection pressure limits are a minimum pressure sufficient to obtain adequate flow of gas through the formation and a maximum pressure less than the amount which would crack the formation and permit the air to bypass the combustion zone. There will generally be a substantial diminution of the gas pressure between the injection and production wells, the amount depending on the many variables inherent in the characteristics of the formation as well as the variables in the operating procedures. In order to effectively carry out an integrated operation in which the flue gas under pressure is combusted and used to drive a gas turbine, as described herein, it is desirable that the recovered flue gas possess a pressure of at least about 75 psi. (0.52 MPa).

The air compressor can be operated at a temperature as low as about 1,200° F. (650° C.) or even lower, but since efficiency exhibits a significant drop at the lower temperatures, it is preferred to operate at a temperature at which significant efficiency is obtained, and particularly a temperature of at least about 1,400° F. (760° C.). The maximum temperature is determined by the temperature resistance of the materials from which the turbine is constructed and can be about 2,000° F. (1,100° C.) or even higher particularly if the compressor is designed with provision for auxiliary cooling but it is preferred that the maximum operating temperature be about 1,800° F. (980° C.). Generally, a large capacity turbine of the type which would be used in the utilization of waste gases from subterranean in situ combustion processes is designed for optimum operation within a specific restricted temperature range.

In the two-stage combustion procedure, it is desirable if at least about one-third of the total air which is to be used in the substoichiometric combustion be added in one combustor, and it is generally preferred that about one-half of this combustion air be added in each combustor. This variation in the amount of combustion air added to each combustor permits the temperature of the waste gas stream, entering the first stage reactor following heat exchange with the combusted gas from the first stage, to be varied. This air that is used for combustion of the waste gas, as well as the air that may be used for cooling the combusted waste gas down to the desired turbine operating temperature, needs to have a pressure only moderately higher than the pressure of the gas streams into which it is injected. For this reason, it is preferred that this air be obtained from a separate low pressure compressor or from a low pressure stage in the multistage compressor rather than using the high pressure air that is obtained for injection into the in situ combustion zone.

As indicated, the temperature of the gas stream following the combustion zone cools down as it flows through the formation so that it is at about the reservoir temperature by the time it is produced. As a result, water vapor in the gas will condense out into the formation prior to the production wells. Additionally, it is believed that sulfur dioxide which may be produced in the underground combustion will remain in the reservoir with the water.

As the final stage of the in situ combustion near, the combustion zone approaches a production well and shows its presence by causing a significant temperature elevation. Since some of the down-hole gases are used to replace the hydrocarbons which are displaced in the direction of the production wells, and since some of the gases leak off into other formations, the amount of flue gas will be less than the amount theoretically obtainable from the quantity of injected air.

It is to be understood that the above disclosure is by way of specific example and that numerous modifications and variations are available to those of ordinary skill in the art without departing from the true spirit and scope of the invention.

We claim:

1. The in situ combustion process for recovering liquid hydrocarbons from subterranean formations which comprises injecting a stream of combustion air into at least one injection well leading to a combustion zone in said subterranean formation, producing liquid hydrocarbons and combustion gas from at least one production well, separating the liquid hydrocarbons from the stream of combustion gas whereby a separated stream of flue gas is obtained having a heating value between about 15 Btu/scf. (559 kJ/m$^3$) and about 200 Btu/scf. (7,450 kJ/m$^3$) and containing at least one aliphatic hydrocarbon having from one to about seven carbon atoms, passing said gas stream admixed with air for combustion in contact with at least one supported platinum oxidation catalyst having palladium incorporated therewith as a cocatalyst in at least one combustion zone at a temperature high enough to initiate and maintain combustion of said gas stream, the total amount of combustion air being sufficient to provide an air equivalence ratio between about 0.20 and about 0.90, expanding the gas stream in a gas turbine following said catalyzed combustion; and driving an air compressor with said gas turbine to compress and inject said stream of combustion air into the said subterranean combustion zone.

2. The in situ combustion process for recovering liquid hydrocarbons from subterranean formations in accordance with claim 1 in which methane comprises at least about 50 mol percent of the hydrocarbon component of said flue gas stream.

3. The in situ combustion process for recovering liquid hydrocarbons from subterranean formations in accordance with claim 1 in which the heating value is between about 40 and about 150 Btu/scf. (1,490 and 5,590 kJ/m$^3$).

4. The in situ combustion process for recovering liquid hydrocarbons from subterranean formations in accordance with claim 1 in which the said stream of flue gas is passed over two oxidation catalysts in series in two stages with a maximum of two-thirds of said air for combustion being added to the gas stream prior to one stage and the remainder of said combustion air being added prior to the other stage.

5. The in situ combustion process for recovering liquid hydrocarbons from subterranean formations in accordance with claim 4 in which each of said oxidation catalysts is identical.

6. The in situ combustion process for recovering liquid hydrocarbons from subterranean formations in accordance with claim 4 in which about one-half of the air for combustion is added in each combustion stage.

7. The in situ combustion process for recovering liquid hydrocarbons from subterranean formations in accordance with claim 1 in which the heating value of the flue gas varies with time within the said range of heating value and the amount of air for combustion is substantially constant with time.

8. The in situ combustion process for recovering liquid hydrocarbons from subterranean formations in accordance with claim 7 in which the variation in heating value of the flue gas in combination with the substantially constant air feed rate does not result in a stoichiometric excess of oxygen over a substantial period of time.

9. The in situ combustion process for recovering liquid hydrocarbons from subterranean formations in accordance with claim 1 in which the heating value of said flue gas is less than about 40 Btu/scf. (1,490 kJ/m$^3$) and supplemental fuel is injected into said flue gas to bring the heating value up to about 40 Btu/scf. (1,490 kJ/m$^3$).

10. The in situ combustion process for recovering liquid hydrocarbons from subterranean formations in accordance with claim 1 in which the air for combustion of the flue gas is fed to the flue gas stream at a rate to maintain a substantially constant temperature in the said catalytically combusted flue gas stream for expansion in said gas turbine.

11. The in situ combustion process for recovering liquid hydrocarbons for subterranean formations in accordance with claim 1 in which said heating value is between about 50 and about 100 Btu/scf. (1,865 and 3,730 kJ/m$^3$).

12. The in situ combustion process for recovering liquid hydrocarbons from subterranean formations in accordance with claim 1 in which the catalyst comprises between about 0.1 and about five weight percent of the catalyst metals and the weight ratio of palladium to platinum is between about 0.2:1 to about 20:1.

13. The in situ combustion process for recovering liquid hydrocarbons from subterranean formations in accordance with claim 1 in which the air equivalence ratio is between about 0.40 and about 0.80.

14. The in situ combustion process for recovering liquid hydrocarbons from subterranean formations in accordance with claim 1 in which the pressure of said combusted gas stream is at least about 75 psi. (0.52 MPa).

15. The in situ combustion process for recovering liquid hydrocarbons from subterranean formations in accordance with claim 1 in which the temperature of the combusted flue gas fed to the gas turbine is between about 1,200 and about 2,000° F. (650° and 1,100° C.).

16. The in situ combustion process for recovering liquid hydrocarbons from subterranean formations in accordance with claim 1 in which the temperature of the combusted flue gas fed to the gas turbine is between about 1,400 and about 1,800° F. (760° and 980° C.).

17. The in situ combustion process for recovering liquid hydrocarbons from subterranean formations in accordance with claim 1 in which a stream of cooling air is injected into said combusted flue gas to reduce the gas temperature fed to the turbine.

* * * * *